(12) United States Patent
Baltaxe et al.

(10) Patent No.: US 12,269,500 B2
(45) Date of Patent: Apr. 8, 2025

(54) ALIGNMENT VALIDATION IN VEHICLE-BASED SENSORS

(71) Applicant: GM Global Technology Operations LLC, Detroit, MI (US)

(72) Inventors: Michael Baltaxe, Kfar Saba (IL); Dan Levi, Ganei Tikvah (IL); Noa Garnett, Herzeliya (IL); Doron Portnoy, Kfar Yona (IL); Amit Batikoff, Petch tikwa (IL); Shahar Ben Ezra, Hod Hasharon (IL); Tal Furman, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 810 days.

(21) Appl. No.: 17/516,348

(22) Filed: Nov. 1, 2021

(65) Prior Publication Data

US 2023/0134125 A1    May 4, 2023

(51) Int. Cl.
*B60W 60/00*     (2020.01)
*G06F 18/214*    (2023.01)
*G06V 20/58*     (2022.01)

(52) U.S. Cl.
CPC ......... *B60W 60/001* (2020.02); *G06F 18/214* (2023.01); *G06V 20/58* (2022.01); *B60W 2420/403* (2013.01); *B60W 2420/408* (2024.01); *B60W 2555/00* (2020.02)

(58) Field of Classification Search
CPC ......... B60W 60/001; B60W 2420/403; B60W 2420/408; B60W 2555/00; G06F 18/214; G06V 20/58; G06V 10/753; G06V 10/803; G01S 7/10; G01S 7/497; G01D 18/00; G04N 17/002
See application file for complete search history.

(56) References Cited

U.S. PATENT DOCUMENTS

| | | | |
|---|---|---|---|
| 10,742,969 B1 * | 8/2020 | Rohatgi | H04N 17/002 |
| 2020/0258249 A1 * | 8/2020 | Angelova | G06T 7/285 |
| 2021/0082148 A1 * | 3/2021 | Parkison | G01S 7/40 |
| 2021/0109205 A1 * | 4/2021 | Liao | G06T 19/20 |
| 2021/0146942 A1 * | 5/2021 | Hrabe | G01S 17/89 |
| 2021/0316669 A1 * | 10/2021 | Wang | G01S 17/86 |
| 2022/0189062 A1 * | 6/2022 | Seo | G06T 15/20 |
| 2022/0315037 A1 * | 10/2022 | Wankhede | G01S 17/931 |
| 2023/0147739 A1 * | 5/2023 | Du | G01S 7/4972 |
| | | | 356/4.01 |
| 2024/0273913 A1 * | 8/2024 | Bharadwaj | B60W 60/001 |
| 2024/0362509 A1 * | 10/2024 | Liu | G06N 7/01 |

* cited by examiner

*Primary Examiner* — Thomas Ingram
(74) *Attorney, Agent, or Firm* — CANTOR COLBURN LLP

(57) ABSTRACT

A system in a vehicle includes an image sensor to obtain images in an image sensor coordinate system and a depth sensor to obtain point clouds in a depth sensor coordinate system. Processing circuitry implements a neural network to determine a validation state of a transformation matrix that transforms the point clouds in the depth sensor coordinate system to transformed point clouds in the image sensor coordinate system. The transformation matrix includes rotation parameters and translation parameters.

20 Claims, 4 Drawing Sheets

ALIGNMENT VALIDATION IN VEHICLE-BASED SENSORS

INTRODUCTION

The subject disclosure relates to alignment validation in vehicle-based sensors.

Vehicles (e.g., automobiles, motorcycles, trucks, construction equipment) increasingly use sensors and communication systems to enhance operation. For example, some sensors (e.g., inertial measurement unit (IMU), wheel angle sensor) may provide information about the vehicle, while other sensors (e.g., cameras, lidar systems, radar systems) provide information about the environment around the vehicle. The information may facilitate semi-autonomous actions (e.g., adaptive cruise control, automatic braking) or autonomous operation of the vehicle or may facilitate providing alerts to the driver. When multiple sensors are used to obtain information about the environment around the vehicle, each sensor has its own coordinate system. Alignment among the coordinate systems of the sensors may be helpful or necessary for accurate detection and may facilitate fusion of sensor information. Accordingly, it is desirable to provide alignment validation in vehicle-based sensors.

SUMMARY

In one exemplary embodiment, a system in a vehicle includes an image sensor to obtain images in an image sensor coordinate system and a depth sensor to obtain point clouds in a depth sensor coordinate system. Processing circuitry implements a neural network to determine a validation state of a transformation matrix that transforms the point clouds in the depth sensor coordinate system to transformed point clouds in the image sensor coordinate system. The transformation matrix includes rotation parameters and translation parameters.

In addition to one or more of the features described herein, the validation state of the transformation matrix is determined as a binary indication of aligned or not aligned.

In addition to one or more of the features described herein, the validation state of the transformation matrix is determined as one or more of a projection loss associated with a projection of the transformed point clouds to an image plane of the image sensor, three-dimensional loss associated with the transformed point clouds, and a rotation and translation loss associated with the rotation parameters and the translation parameters.

In addition to one or more of the features described herein, the image sensor is a camera and the processing circuitry obtains an image representation based on one or more of the images.

In addition to one or more of the features described herein, the image representation indicates red, green, blue (RGB) intensity levels of the one or more of the images or an image gradient magnitude for the one or more of the images.

In addition to one or more of the features described herein, the depth sensor is a radar system or a lidar system and the processing circuitry obtains a point cloud representation based on one or more of the point clouds.

In addition to one or more of the features described herein, the point cloud representation indicates depth and intensity level for each point of the one or more of the point clouds, aggregated depth and aggregated intensity for stationary points of two or more of the point clouds, or aggregated depth gradient magnitude and aggregated intensity gradient magnitude for the two or more of the point clouds.

In addition to one or more of the features described herein, the processing circuitry trains the neural network based on image data from an aligned image sensor that is aligned with an aligned depth sensor and based on transformed point cloud data that is obtained from the aligned depth sensor and transformed, using an aligned transformation matrix, to a coordinate system of the aligned image sensor.

In addition to one or more of the features described herein, the processing circuitry generates training samples by perturbing one or more parameters that make up the rotation parameters and the translation parameters of the aligned transformation matrix.

In addition to one or more of the features described herein, an amount of perturbation of the one or more parameters is randomly selected for each of the training samples.

In another exemplary embodiment, a method in a vehicle includes obtaining images from an image sensor in an image sensor coordinate system and obtaining point clouds from a depth sensor in a depth sensor coordinate system. The method also includes implementing a neural network to determine a validation state of a transformation matrix that transforms the point clouds in the depth sensor coordinate system to transformed point clouds in the image sensor coordinate system. The transformation matrix includes rotation parameters and translation parameters.

In addition to one or more of the features described herein, determining the validation state of the transformation matrix is as a binary indication of aligned or not aligned.

In addition to one or more of the features described herein, determining the validation state is as one or more of a projection loss associated with a projection of the transformed point clouds to an image plane of the image sensor, three-dimensional loss associated with the transformed point clouds, and a rotation and translation loss associated with the rotation parameters and the translation parameters.

In addition to one or more of the features described herein, the method also includes obtaining an image representation based on one or more of the images from the image sensor that is a camera.

In addition to one or more of the features described herein, the image representation indicates red, green, blue (RGB) intensity levels of the one or more of the images or an image gradient magnitude for the one or more of the images.

In addition to one or more of the features described herein, the method also includes obtaining a point cloud representation based on one or more of the point clouds from the depth sensor that is a radar system or a lidar system.

In addition to one or more of the features described herein, the point cloud representation indicates depth and intensity level for each point of the one or more of the point clouds, aggregated depth and aggregated intensity for stationary points of two or more of the point clouds, or aggregated depth gradient magnitude and aggregated intensity gradient magnitude for the two or more of the point clouds.

In addition to one or more of the features described herein, the method also includes training the neural network based on image data from an aligned image sensor that is aligned with an aligned depth sensor and based on transformed point cloud data that is obtained from the aligned depth sensor and transformed, using an aligned transformation matrix, to a coordinate system of the aligned image sensor.

In addition to one or more of the features described herein, the method also includes generating training samples by perturbing one or more parameters that make up the rotation parameters and the translation parameters of the aligned transformation matrix.

In addition to one or more of the features described herein, the perturbing includes an amount of perturbation of the one or more parameters being randomly selected for each of the training samples.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
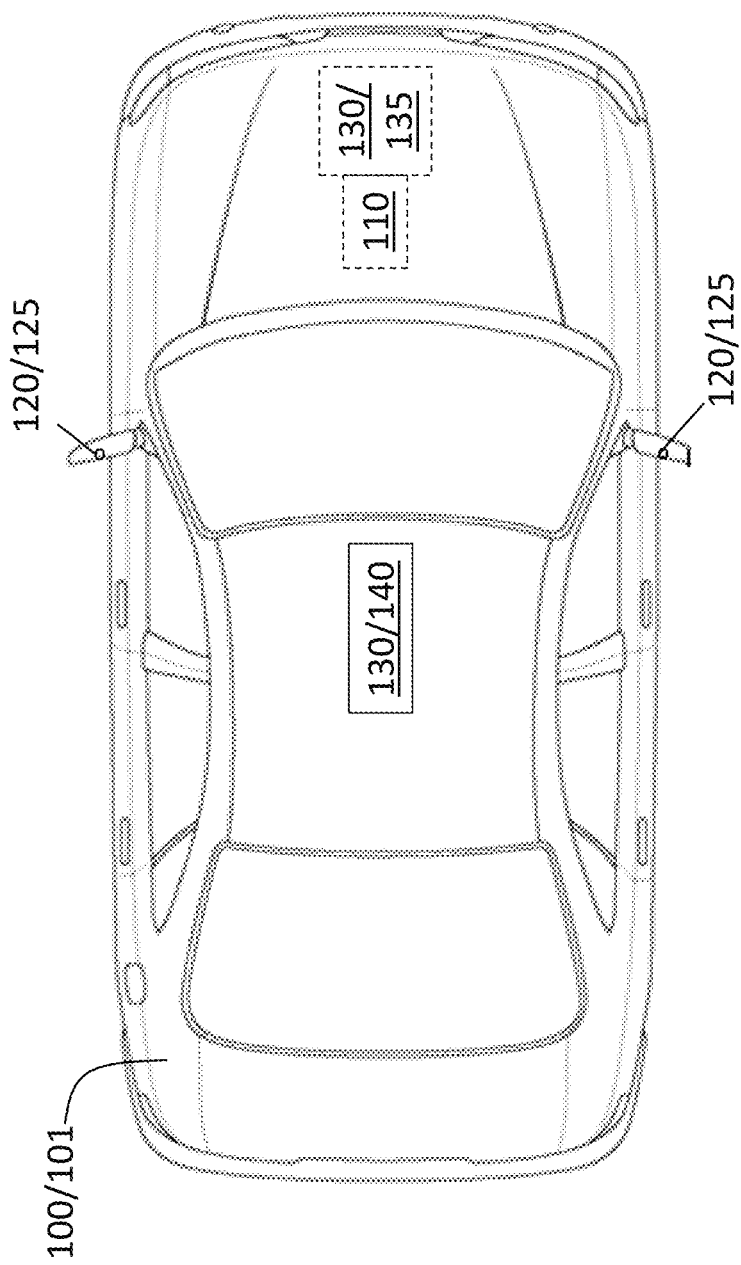
FIG. 1 is a block diagram of a vehicle that includes alignment validation between an image sensor and a depth sensor according to one or more embodiments.

The following description is merely exemplary in nature and is not intended to limit the present disclosure, its application or uses. It should be understood that throughout the drawings, corresponding reference numerals indicate like or corresponding parts and features.

As previously noted, more than one vehicle-based sensor may be used to obtain information about the environment around the vehicle. As also noted, alignment of one sensor with the others may be desirable in that case. The alignment process is the process of finding a transformation matrix that provides information from the coordinate system of one sensor in the coordinate system of another. When the transformation matrix correctly provides the information from one coordinate system in the other, the two sensors are said to be properly aligned. When the transformation matrix does not provide information from one coordinate system in the other coordinate system correctly, the two coordinate systems or, more generally, the sensors are said to be misaligned. Prior approaches involve a manual determination of alignment or a time-consuming process of determining alignment parameters when misalignment is suspected.

Embodiments of the systems and methods detailed herein relate to alignment validation in vehicle-based sensors. Specifically, validation of alignment between an image sensor (e.g., camera) that obtains an image in one coordinate system and a depth sensor (e.g., lidar system, radar system) that obtains a three-dimensional point cloud in another coordinate system is detailed for explanatory purposes. Alignment involves transformation (i.e., rotation and translation) of the point cloud obtained by the depth sensor into the coordinate system of the image sensor followed by projection into the image obtained by the image sensor based on parameters of the image sensor. A neural network is trained to provide a quick assessment of alignment in the form of a binary indication (i.e., aligned or not aligned) or alignment error measures. The error measures (i.e., losses) may pertain to projection loss, three-dimensional loss, or rotation and translation loss. The neural network-based validation facilitates foregoing the determination of alignment parameters unless the sensors are actually misaligned.

In accordance with an exemplary embodiment, FIG. 1 is a block diagram of a vehicle 100 that includes alignment validation between an image sensor 120 and depth sensor 130. The exemplary vehicle 100 in FIG. 1 is an automobile 101. The exemplary image sensor 120 may be a camera 125 and the exemplary depth sensor 130 may be a radar system 135 or a lidar system 140. The vehicle 100 includes a controller 110 that may control one or more aspects of the operation of the vehicle 100. For example, the controller 110 may obtain information from an image sensor 120, depth sensor 130, or a combination of sensors to control autonomous operation or semi-autonomous actions (e.g., automatic braking, adaptive cruise control) by the vehicle 100.

Figure 2:
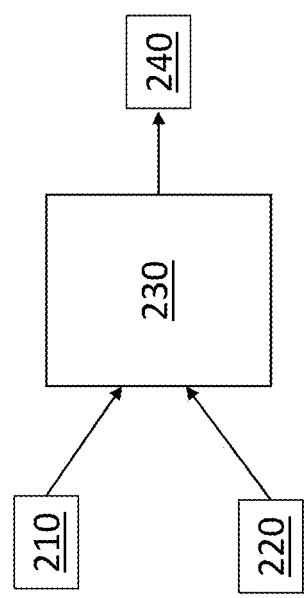
FIG. 2 is a process flow of alignment validation according to one or more embodiments.

According to one or more embodiments, the controller 110 may perform the alignment validation, as detailed. Performing the alignment validation includes indicating a validation state 240 (FIG. 2). This validation state 240 may simply be an indication of alignment or misalignment. Alternately, the validation state 240 may be an indication of one or more error measures. Based on the validation state 240 determined by the alignment validation process, the controller 110 may obtain alignment parameters or forgo additional processing related to alignment. The controller 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

FIG. 2 is a process flow of alignment validation according to one or more embodiments. In the exemplary embodiment shown in FIG. 2, an image representation 210 and a point cloud representation 220 are provided to a neural network 230. The neural network 230 may be implemented by the controller 110. The image representation 210 and point cloud representation 220 may be provided, respectively, by the image sensor 120 and depth sensor 130. Alternately, the image representation 210 and point cloud representation 220 may result from processing, by the controller 110, of data obtained, respectively, from the image sensor 120 and depth sensor 130. Generally, the point cloud representation 220 is in the coordinate system of the image sensor 120. The image representation 210 and point cloud representation 220 are further discussed with reference to FIG. 3.

The neural network 230 implementation is not limited to any particular architecture. For example, each of the image representation 210 and the point cloud representation 220 may be encoded separately to generate separate feature maps. This may be followed by a fusion layer that concatenates the feature maps or forms a correlation layer between the feature maps. Alternately, the image representation 210 and point cloud representation 220 may be stacked prior to implementation of a standard backbone such that the neural network learns a single set of parameters. The output of the neural network 230 is the validation state 240 with a binary indication (e.g., aligned or misaligned) or an indication of alignment quality based on one or more error measures. The validation state 240 and training of the neural network 230 are further discussed with reference to FIG. 4.

Figure 3:
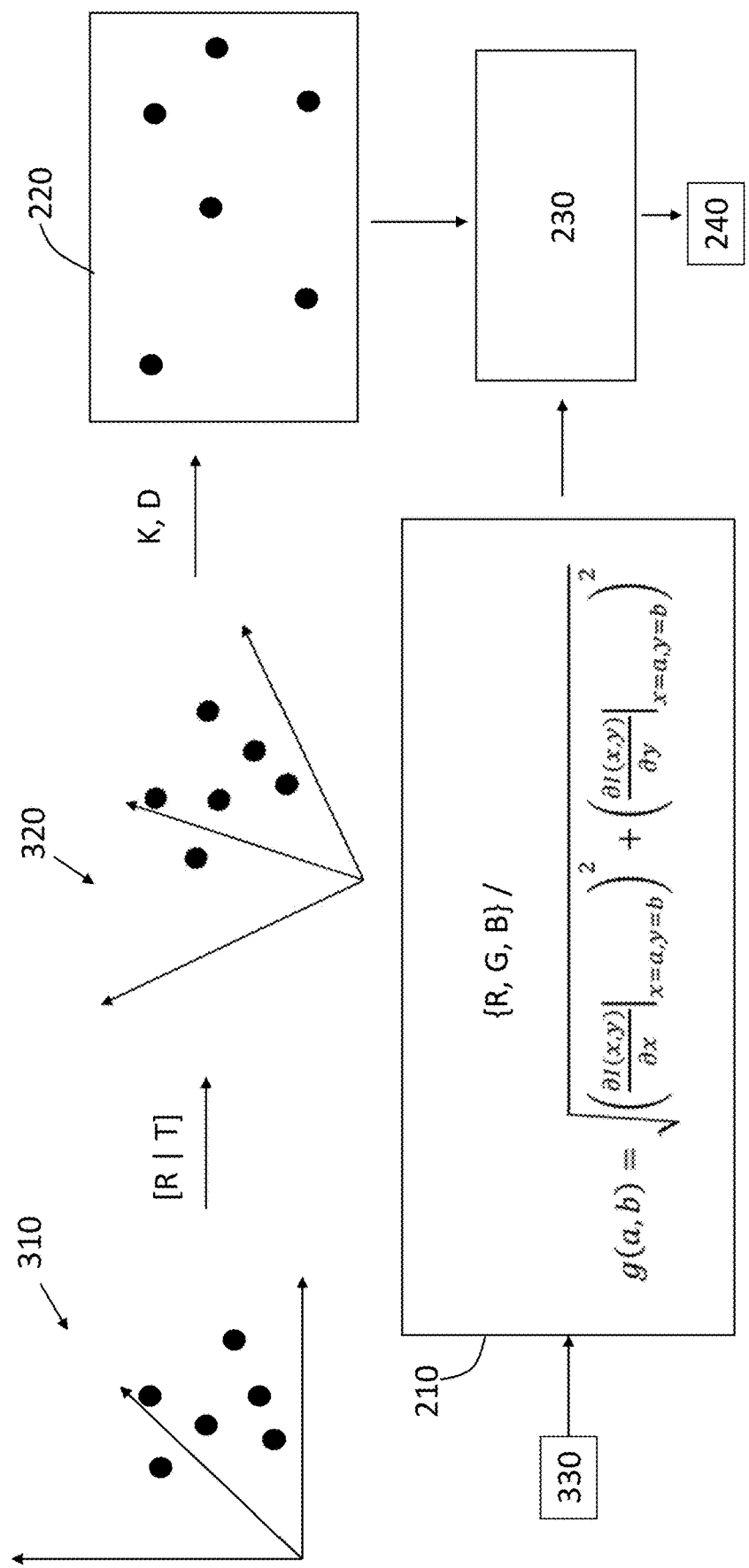
FIG. 3 illustrates processes involved in obtaining alignment validation according to one or more embodiments.

FIG. 3 illustrates processes involved in obtaining alignment validation according to one or more embodiments. A point cloud 310 is shown in the coordinate system of the depth sensor 130. The point cloud 310 is three-dimensional, as shown. A transformation of the point cloud 310, based on a rotation and translation process (indicated as [R|T]), is used to obtain a transformed point cloud 320 in the coordinate system of the image sensor 120. The transformed point cloud 320, like the point cloud 310, is three-dimensional. A projection of the three-dimensional transformed point cloud 320 to the two-dimensional image plane of the image sensor 120 is based on known camera intrinsic (K) and lens distortion (D) parameters.

The result of the projection is indicated as an exemplary point cloud representation 220 in FIG. 3. Specifically, each point indicates {instantaneous depth, instantaneous point intensity}. Alternately, the point cloud representation 220 may result from an aggregation of the result over two or more frames. Aggregation refers to an accumulation of point clouds over the two or more frames (i.e., with two or more timestamps). Each point of the point cloud may be assigned a depth from any one of the timestamps. The result is an indication {aggregated depth, aggregated point intensity}. According to yet another alternative, a gradient magnitude may be computed on the aggregation result. The gradient magnitude of a parameter is a scalar quantity describing a local rate of change of the parameter. In this case, the point cloud representation 220, according to the alternate embodiment, may indicate {aggregated depth gradient magnitude, aggregated point intensity gradient magnitude}. In the case of aggregation, points of the point cloud 310 that pertain to moving objects (e.g., pedestrian, another vehicle) are removed. The point cloud representation 220 according to one of the examples is one of the inputs of the neural network 230.

FIG. 3 also indicates an image 330 obtained by the image sensor 120. The image 330 is two-dimensional in the x, y plane, for example. The image representation 210 may be the image 330 itself, indicating the intensity of red, green, and blue {R, G, B}, for example. Alternately, the image representation 210 may be an image gradient magnitude obtained as g(a, b), as indicated. The image representation 210 according to one of the examples is another of the inputs to the neural network 230. The input to the neural network 230 may be a stack of image representations 210 and a stack of point cloud representations 220. The image representation 210 and the point cloud representation 220 are obtained independently. That is, for example, the image representation 210 may be an {R, B, G} indication of the image 330 while the point cloud representation 220 indicates {aggregated depth gradient magnitude, aggregated point intensity gradient magnitude}. The neural network 230 provides the validation state 240 using the image representation 210 and the point cloud representation 220.

Figure 4:
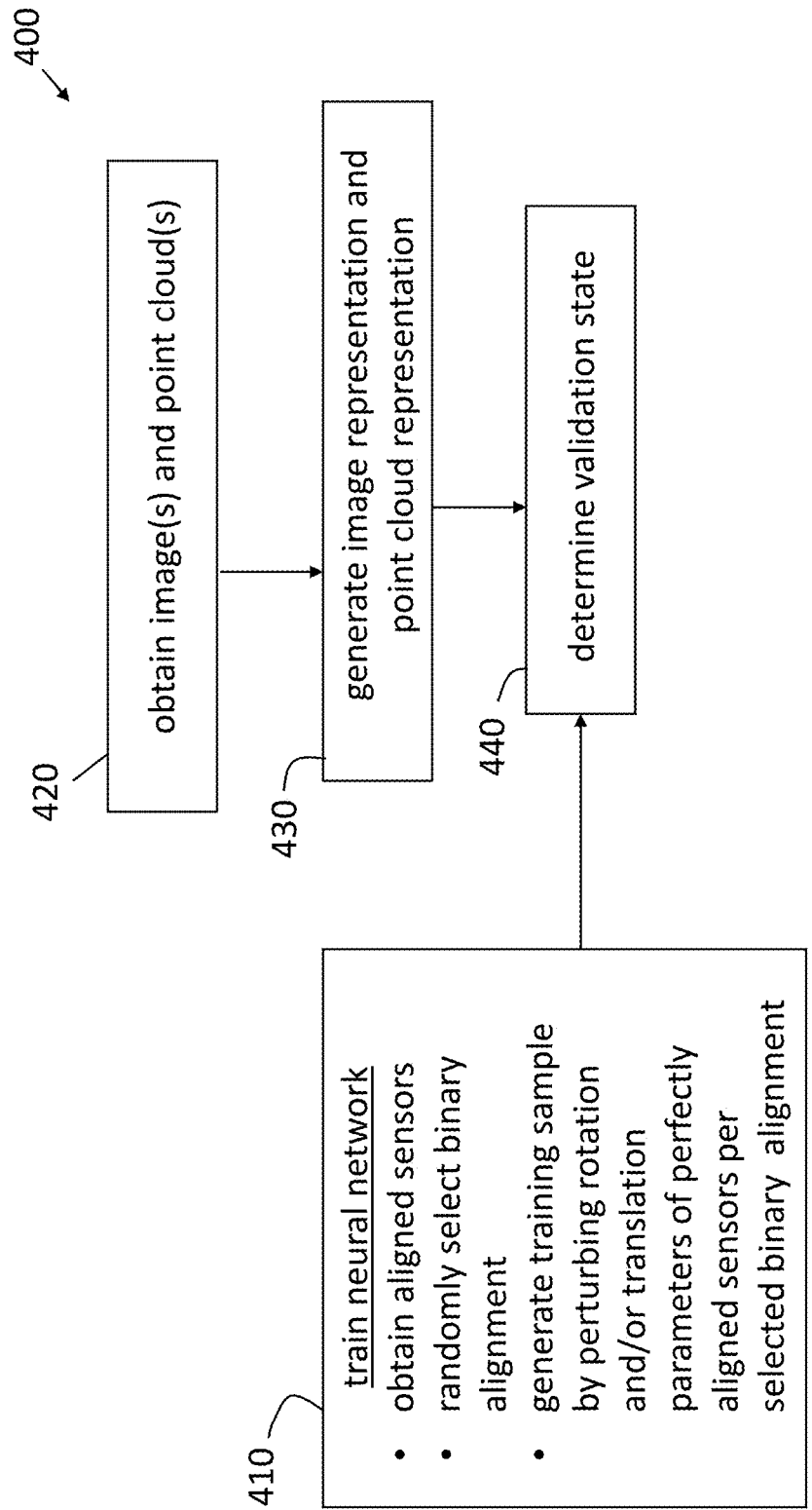
FIG. 4 is a process flow of a method of providing alignment validation in vehicle-based sensors according to one or more embodiments.

FIG. 4 is a process flow of a method 400 of providing alignment validation in vehicle-based sensors 120, 130 according to one or more embodiments. The processes shown in FIG. 4 may be performed by processing circuitry of the controller 110, for example. At block 410, training the neural network 230 includes several processes. Aligned sensors 120, 130 are obtained. That is, an image sensor 120 and depth sensor 130 are aligned such that the rotation parameters (yaw, pitch, roll) and translation parameters (x, y, z) correctly transform point clouds 310 obtained by the depth sensor 130 to the coordinate system of the image sensor 120. The six parameters {yaw, pitch, roll, x, y, z} that make up the transformation matrix of the aligned sensors 120, 130 represent ground truth.

As part of the training, at block 410, binary alignment (i.e., good alignment, bad alignment) is randomly selected following a Bernoulli distribution with probability of alignment p=0.5. Then, a training sample is generated by perturbing one or more of the six parameters according to the selected binary alignment. If good alignment is randomly selected, then one or more of the six parameters is varied with a uniform distribution between g1 and g2, and if bad alignment is randomly selected, then one or more of the six parameters is varied with a uniform distribution between b1 and b2, where 0≤g1<g2<b1<b2. The perturbation of each parameter may be independently selected within the dictated uniform distribution. Further, some of the six parameters may not be perturbed at all. The neural network 230 is trained using a number of the training samples generated as described. Once the neural network 230 is trained, it can provide a validation state 240 based on inputs of an image representation 210 and point cloud representation 220.

At block 420, obtaining one or more images 330 is from the image sensor 120, and obtaining one or more point clouds is from the depth sensor 130 (e.g., radar system, lidar system). At block 430, generating an image representation 210 and a point cloud representation 220 is according to one of the exemplary approaches discussed with reference to FIG. 3. For example, the image representation 210 may be a stack of {R, G, B} indications in a number of images 330, while the point cloud representation 220 may be an indication of {aggregated depth, aggregated point intensity}. At block 440, determining validation state 240 is performed by the trained neural network 230.

As previously noted, the validation state 240 may be a binary indication (i.e., aligned or not aligned) or may provide alignment error measures. The error measures (i.e., losses) may pertain to projection loss, three-dimensional loss, or rotation and translation loss. Each of these is explained with reference to the training samples (i.e., training point cloud representation 220 generated through perturbation of one or more of the six parameters {yaw, pitch, roll, x, y, z}). Projection loss and three-dimensional loss are both indications of a distance between perfectly aligned points and the point cloud representation 220 that is provided with perturbation.

Projection loss is an indication of the distance s on the two-dimensional image plane and is given by:

$$s = \frac{1}{N}\sum_{i=1}^{N} \left\| P([\hat{R}|\hat{T}]X_i) - P([R|T]X_i) \right\| \qquad [\text{EQ. 1}]$$

[R|T] is the rotation and translation of aligned sensors 120, 130 (i.e., the six parameters obtained as part of the processes at block 410 for aligned sensors 120, 130). $[\hat{R}|\hat{T}]$ In is the rotation and translation resulting from the perturbation. $X_i$ is the three-dimensional (homogeneous) coordinates of each point i of N total points of the point cloud 310 in the coordinate system of the depth sensor 130. P(Y) is the projection result (i.e., two-dimensional coordinates in the image plane) of a given point Yin the three-dimensional coordinate system of the image sensor 120.

Three-dimensional loss is an indication of the distance s in three-dimensions (i.e., not projected) and is given by:

$$s = \frac{1}{N}\sum_{i=1}^{N} \left\| [\hat{R}|\hat{T}]X_i - [R|T]X_i \right\| \qquad [\text{EQ. 2}]$$

Rotation and translation loss may also be computed as detailed. The difference rotation matrix between aligned rotation R and perturbed rotation $\hat{R}$ is $R\hat{R}^T$ Based on the composition of a rotation matrix, $\hat{R}^T = \hat{R}^{-1}$. Based on Rodrigues' rotation formula, a rotation matrix may be expressed as an axis of rotation (i.e., a direction) and an angle θ (i.e., a quantity). Specifically, $$\theta = \arccos\left(\frac{\operatorname{trace}\left(R\hat{R}^T\right) - 1}{2}\right) \quad [\text{EQ. 3}]$$

With weighting factors α and β, such that α≥0, β≥0, and α+β=1, the rotation and translation loss is given by:

$$s = \alpha \cdot \arccos\left(\frac{\operatorname{trace}\left(R\hat{R}^T\right) - 1}{2}\right) + \beta \cdot \|T - \hat{T}\| \quad [\text{EQ. 4}]$$

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system in a vehicle comprising:
    an image sensor configured to obtain images in an image sensor coordinate system;
    a depth sensor configured to obtain point clouds in a depth sensor coordinate system; and
    processing circuitry configured to implement a neural network to determine a validation state of a transformation matrix configured to transform the point clouds in the depth sensor coordinate system to transformed point clouds in the image sensor coordinate system, the transformation matrix including rotation parameters and translation parameters, and wherein the processing circuitry is configured to train the neural network based on image data from an aligned image sensor that is aligned with an aligned depth sensor and based on transformed point cloud data that is obtained from the aligned depth sensor and transformed, using an aligned transformation matrix, to a coordinate system of the aligned image sensor.

2. The system according to claim 1, wherein the validation state of the transformation matrix is determined as a binary indication of aligned or not aligned.

3. The system according to claim 1, wherein the validation state of the transformation matrix is determined as one or more of a projection loss associated with a projection of the transformed point clouds to an image plane of the image sensor, three-dimensional loss associated with the transformed point clouds, and a rotation and translation loss associated with the rotation parameters and the translation parameters.

4. The system according to claim 1, wherein the image sensor is a camera and the processing circuitry obtains an image representation based on one or more of the images.

5. The system according to claim 4, wherein the image representation indicates red, green, blue (RGB) intensity levels of the one or more of the images or an image gradient magnitude for the one or more of the images.

6. The system according to claim 4, wherein the depth sensor is a radar system or a lidar system and the processing circuitry obtains a point cloud representation based on one or more of the point clouds.

7. The system according to claim 6, wherein the point cloud representation indicates depth and intensity level for each point of the one or more of the point clouds, aggregated depth and aggregated intensity for stationary points of two or more of the point clouds, or aggregated depth gradient magnitude and aggregated intensity gradient magnitude for the two or more of the point clouds.

8. The system according to claim 1, wherein the processing circuitry is configured to generate training samples by perturbing one or more parameters that make up the rotation parameters and the translation parameters of the aligned transformation matrix.

9. The system according to claim 8, wherein an amount of perturbation of the one or more parameters is randomly selected for each of the training samples.

10. The system of claim 1, wherein the transformational matrix comprises a yaw parameter, a pitch parameter, a roll parameter, an x parameter, a y parameter, and a z parameter.

11. A method in a vehicle comprising:
    obtaining, by processing circuitry, images from an image sensor in an image sensor coordinate system;
    obtaining, by the processing circuitry, point clouds from a depth sensor in a depth sensor coordinate system; and
    implementing, by the processing circuitry, a neural network to determine a validation state of a transformation matrix configured to transform the point clouds in the depth sensor coordinate system to transformed point clouds in the image sensor coordinate system, the transformation matrix including rotation parameters and translation parameters; and
    training the neural network based on image data from an aligned image sensor that is aligned with an aligned depth sensor and based on transformed point cloud data that is obtained from the aligned depth sensor and transformed, using an aligned transformation matrix, to a coordinate system of the aligned image sensor.

12. The method according to claim 11, wherein determining the validation state of the transformation matrix is as a binary indication of aligned or not aligned.

13. The method according to claim 11, wherein determining the validation state is as one or more of a projection loss associated with a projection of the transformed point clouds to an image plane of the image sensor, three-dimensional loss associated with the transformed point clouds, and a rotation and translation loss associated with the rotation parameters and the translation parameters.

14. The method according to claim 11, further comprising obtaining an image representation based on one or more of the images from the image sensor that is a camera.

15. The method according to claim 14, wherein the image representation indicates red, green, blue (RGB) intensity levels of the one or more of the images or an image gradient magnitude for the one or more of the images.

16. The method according to claim 14, further comprising obtaining a point cloud representation based on one or more of the point clouds from the depth sensor that is a radar system or a lidar system.

17. The method according to claim 16, wherein the point cloud representation indicates depth and intensity level for each point of the one or more of the point clouds, aggregated depth and aggregated intensity for stationary points of two or more of the point clouds, or aggregated depth gradient magnitude and aggregated intensity gradient magnitude for the two or more of the point clouds.

18. The method according to claim 11, further comprising generating training samples by perturbing one or more parameters that make up the rotation parameters and the translation parameters of the aligned transformation matrix.

19. The method according to claim 18, wherein the perturbing includes an amount of perturbation of the one or more parameters being randomly selected for each of the training samples.

20. The method of claim 11, wherein the transformational matrix comprises a yaw parameter, a pitch parameter, a roll parameter, an x parameter, a y parameter, and a z parameter.

* * * * *